(12) United States Patent
Glinsner

(10) Patent No.: US 7,040,273 B2
(45) Date of Patent: May 9, 2006

(54) MASS BALANCING FOR INTERNAL COMBUSTION ENGINE

(75) Inventor: Karl Glinsner, Wels (AT)

(73) Assignee: BRP-Rotax GmbH & Co. KG, Gunskirchen (AU)

( * ) Notice: Subject to any disclaimer, the term of this patent is extended or adjusted under 35 U.S.C. 154(b) by 0 days.

(21) Appl. No.: 10/833,136

(22) Filed: Apr. 28, 2004

(65) Prior Publication Data

US 2004/0211384 A1    Oct. 28, 2004

Related U.S. Application Data

(60) Provisional application No. 60/465,780, filed on Apr. 28, 2003.

(51) Int. Cl.
*F02B 75/06* (2006.01)

(52) U.S. Cl. ..................................... 123/192.2; 74/603

(58) Field of Classification Search ............. 123/192.2; 74/603, 604
See application file for complete search history.

(56) References Cited

U.S. PATENT DOCUMENTS

| | | | |
|---|---|---|---|
| 1,310,090 A | 7/1919 | Ricardo | |
| 1,794,715 A | 3/1931 | Knight | |
| 2,235,160 A | 3/1941 | Ljungstrom | |
| 3,112,658 A | 12/1963 | Berlyn | |
| 3,457,804 A | 7/1969 | Harkness | |
| 4,819,593 A | 4/1989 | Bruener et al. | |
| 5,282,397 A | 2/1994 | Harkness et al. | |
| 6,295,962 B1 | 10/2001 | Walker | |
| 6,382,166 B1 | 5/2002 | Klika et al. | |
| 6,418,902 B1 | 7/2002 | Ericson | |

FOREIGN PATENT DOCUMENTS

| | | |
|---|---|---|
| DE | 3046309 | 8/1986 |
| EP | 077634 | 10/1982 |
| GB | 2311820 | 10/1992 |
| IT | 1243824 | 6/1994 |
| JP | 62056645 | 12/1987 |
| WO | WO 1997037151 | 10/1997 |

*Primary Examiner*—Noah P. Kamen
(74) *Attorney, Agent, or Firm*—Osler, Hoskin & Harcourt LLP

(57) ABSTRACT

An internal combustion engine includes a crankcase, a cylinder, a piston, a crankshaft, and a piston connecting rod. A counterweight connects to the crankshaft through a counterweight connecting rod. The counterweight pivotally connects to the crankcase. The engine is constructed such that the crankshaft drives the counterweight less than 180 degrees out of phase with the motion of the piston. A center of gravity of the crankshaft is offset from the crankshaft's axis and moves out of phase with the piston by less than 180 degrees. The offset counterweight and crankshaft balance out inertial forces in the engine to reduce engine vibrations and improve engine performance.

13 Claims, 3 Drawing Sheets

MASS BALANCING FOR INTERNAL COMBUSTION ENGINE

CROSS REFERENCE TO RELATED APPLICATIONS

This invention relates to and claims priority from U.S. provisional Ser. No. 60/465,780, filed Apr. 28, 2003, which is hereby incorporated by reference in its entirety.

BACKGROUND OF THE INVENTION

1. Field of the Invention

This invention relates to devices for counterbalancing free inertial forces in internal combustion, reciprocating-piston, crankshaft engines.

2. Description of Related Art

Internal combustion piston engines include a crankshaft that rotates in a crankcase about a crankshaft axis. A reciprocating piston connects to a piston connecting rod, which, in turn, pivotally connects to the crankshaft at a piston connecting rod axis.

Operation of such conventional engines creates vibrations in the engine. The magnitude of these vibrations depends on the underlying design concept of engine and on the principle according to which it operates (two-cycle, four-cycle). The orientation and magnitude of these vibrations also depend on the number of cylinders and on how the individual cylinders are arranged relative to each other. Internal combustion engines that have a large number of cylinders usually have very good mass compensation for the crankshaft drive forces and moments, so that such engines seldom require mass compensation to balance the inertial forces. In order to keep the inertial forces as small as possible in an internal combustion engine that has only a small number of cylinders, on the other hand, one or a plurality of counterweights are arranged within the crankcase in such a way that they balance out the inertial forces of the engine very precisely by operating at the same frequency (or a multiple thereof), but phase-shifted through 180 degrees. This means that when the piston moves downwards, the counterweight moves upwards and vice versa.

U.S. Pat. No. 4,819,593 discloses one such counterbalancing system. A counterweight pivotally connects to a crankcase and to a counterweight connecting rod/link. The counterweight connecting rod, in turn, pivotally connects to the crankshaft for relative rotation about a counterweight connecting rod axis. Rotation of the crankshaft drives the counterweight 180 degrees out of phase. Consequently, the crankshaft axis, connecting rod axis, and counterweight connecting rod axis are coplanar.

Conventional counterbalancing systems often include many moving parts and are expensive to construct and maintain. While conventional mass balancing systems reduce engine vibrations, they do not totally eliminate all engine vibration.

SUMMARY OF THE INVENTION

Accordingly, one aspect of one or more embodiments of the present invention provides a mass balancing system for an internal combustion engine that is simpler, less expensive, and/or more effective than conventional mass balancing systems.

Another aspect of one or more embodiments of the present invention provides an internal combustion engine that includes a crankcase, a crankshaft pivotally connected to the crankcase for relative rotation about a crankshaft axis, a piston, and a piston connecting rod pivotally connected to the piston. The piston connecting rod pivotally connects to the crankshaft for relative rotation about a piston connecting rod axis. The engine also includes a counterweight connecting rod pivotally connected to the crankshaft for relative rotation about a counterweight connecting rod axis. The engine further includes a counterweight connected to the counterweight connecting rod. A counterweight angle is formed between the piston connecting rod axis, the crankshaft axis, and the counterweight connecting rod axis. The crankshaft axis defines a vertex of the counterweight angle. The counterweight angle is more than 0 degrees and less than 180 degrees.

According to a further aspect of one or more of these embodiments, the counterweight angle is at least 90 degrees. The counterweight angle may be between 150 and 179 degrees. The counterweight angle may be between 165 and 175 degrees.

According to a further aspect of one or more of these embodiments, the crankshaft has a center of gravity that is offset from the crankshaft axis.

According to a further aspect of one or more of these embodiments, the crankshaft axis and piston connecting rod axis define a reference plane. The crankshaft center of gravity and the counterweight connecting rod axis are disposed on opposite sides of the reference plane. The counterweight may pivotally connect to the crankcase at an axis that is disposed on the same side of the reference plane as the crankshaft center of gravity when the piston is in a top dead center position.

According to a further aspect of one or more of these embodiments, a crankshaft center of gravity angle is formed between the piston connecting rod axis, the crankshaft axis, and the crankshaft center of gravity. The crankshaft axis defines a vertex of the crankshaft center of gravity angle. The crankshaft center of gravity angle is more than 0 degrees and less than 180 degrees. The crankshaft center of gravity angle may be at least 90 degrees. The crankshaft center of gravity angle may be between 1 and 179 degrees.

According to a further aspect of one or more of these embodiments, the counterweight pivotally connects to the counterweight connecting rod. The counterweight may also pivotally connect to the crankcase.

According to a further aspect of one or more of these embodiments, the internal combustion engine is a two cylinder, in-line, four-cycle internal combustion engine.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which from a part of this original disclosure.

DETAILED DESCRIPTION OF PREFERRED EMBODIMENTS

Figure 1:
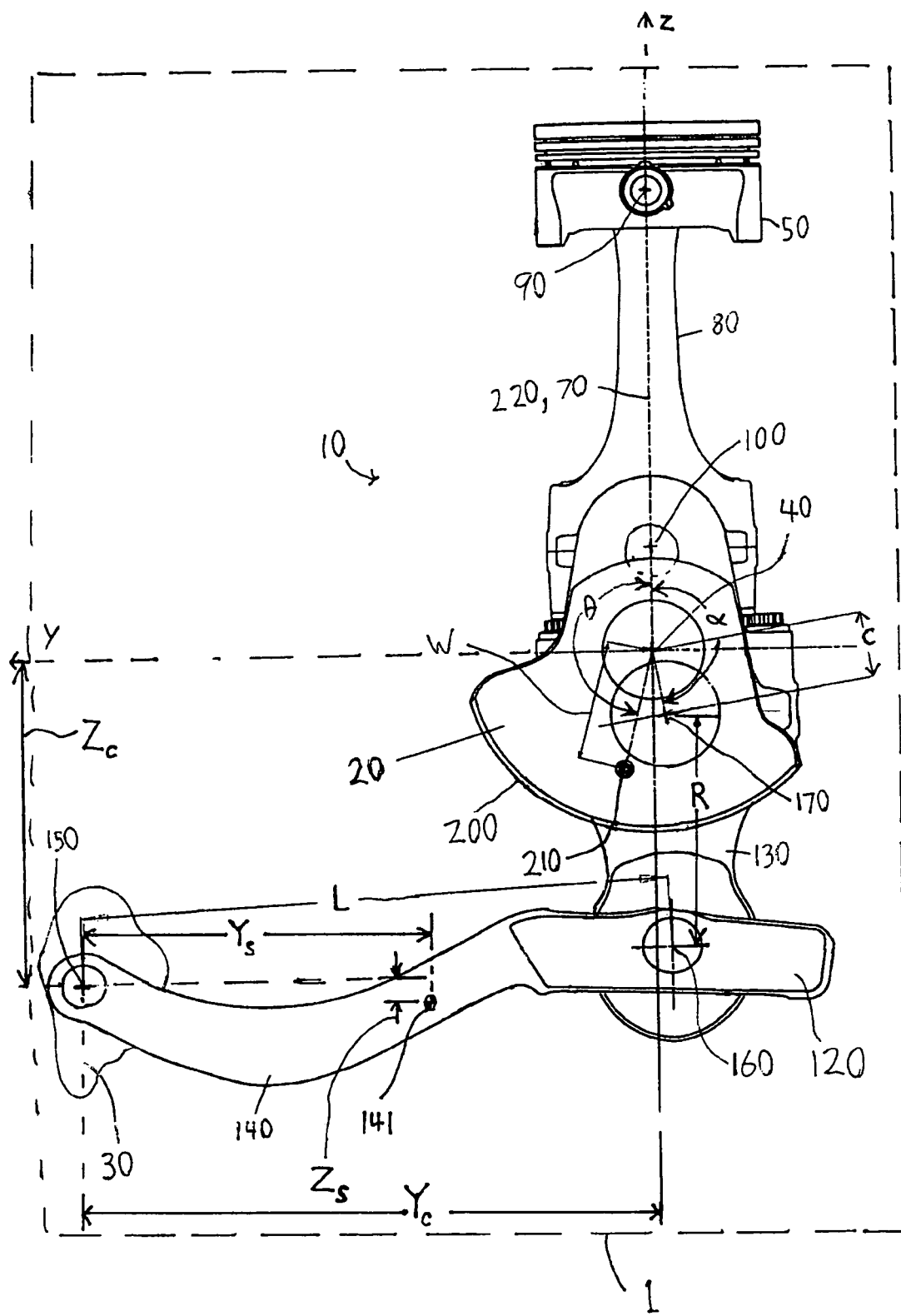
FIG. 1 is a partial front view of an engine according to an embodiment of the present invention.
Figure 2:
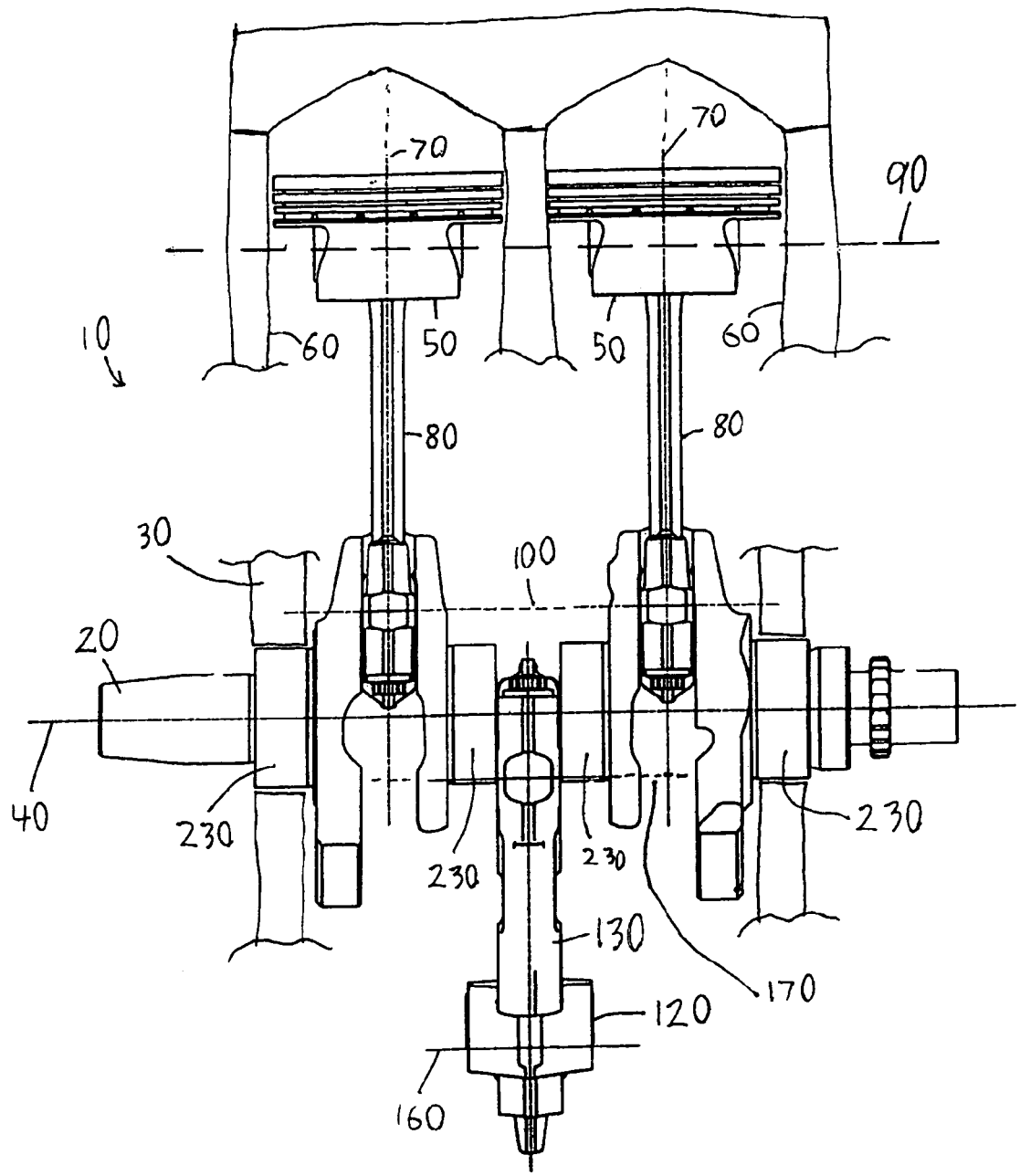
FIG. 2 is a partial side view of the engine illustrated in FIG. 1.

FIGS. 1 and 2 illustrate an internal combustion engine 10 according to an embodiment of the present invention. As shown in FIG. 1, the engine 10 is incorporated into a vehicle 1, which may be any type of suitable vehicle. A crankshaft 20 pivotally mounts to a crankcase 30 (see FIG. 2) for relative rotation about a crankshaft axis 40. Two pistons 50 slidingly engage two cylinders 60 for relative reciprocating movement along cylinder axes 70. The pistons 50 operatively connect to the crankshaft 20 via piston connecting rods 80. The piston connecting rods 80 pivotally connect to the pistons 50 at piston axes 90 and pivotally connect to the crankshaft 20 at first connecting-rod journals having first connecting-rod journal axes which are refered to as piston connecting rod axes 100. The engine 10 also includes a variety of other conventional components, as would be understood by one of ordinary skill in the art. As shown in FIG. 1, the engine 10 may be designed to rotate the crankshaft 20 in either clockwise or counterclockwise directions.

The illustrated engine 10 is a two-cylinder engine in which both pistons 50 operate in phase. Accordingly, the axes 90 are co-axially aligned and the axes 100 are co-axially aligned. Other engines according to the present invention may incorporate greater or fewer cylinders (e.g., one cylinder or three or more cylinders) and may include cylinders that operate out of phase with each other without deviating from the scope of the present invention. The illustrated engine 10 is a four-cycle engine. However, two-cycle engines are also within the intended scope of the present invention. The illustrated engine 10 has in line cylinders 60 but may alternatively be a V-type engine.

As shown in FIG. 1, the engine 10 includes a counterweight 120 that connects to the crankshaft 20 through a counterweight connecting rod 130. The counterweight 120 includes an integrally formed lever arm 140 that pivotally connects to the crankcase 30 at a lever arm axis 150. The counterweight 120 and lever arm 140 may alternatively be separately formed and rigidly connected to each other. The counterweight 120 (including the lever arm 140) has a center of gravity 141.

As shown in FIG. 1, the cylinder axis 70 defines a vertical z axis. A horizontal y axis is normal to the z axis. The lever arm axis 150 is spaced from the crankshaft axis 140 by a vertical distance $Z_c$ and a horizontal distance $Y_c$. When the pistons 50 are in their top dead center positions, the counterweight center of gravity 141 is spaced from the lever arm axis 150 by a vertical distance $Z_s$ and a horizontal distance $Y_s$.

The counterweight 120 pivotally connects to the counterweight connecting rod 130 at a counterweight axis 160. The counterweight connecting rod 130 pivotally connects to the crankshaft 20 at a second connecting-rod journal having a second connecting-rod journal axis which is referred to as a counterweight connecting rod axis 170. The counterweight connecting rod axis 170 is offset from the crankshaft axis 40 by a distance C. The counterweight connecting rod 130 has a length R, which extends between the counterweight connecting rod axis 170 and the counterweight axis 160.

Rotation of the crankshaft 20 drives the counterweight connecting rod 130, which, in turn, drives the counterweight 120. A distance L between the lever arm axis 150 and the counterweight axis 160 is as large as possible and the lever arm 140 extends in a direction that is generally perpendicular to the cylinder axis 70. Consequently, the counterweight 120 moves along a path that is roughly parallel to the cylinder axis 70 and as straight as possible. This lever arm 140 positioning minimizes inertial forces that are transverse to the cylinder axis 70.

As shown in FIG. 1, a counterweight angle α is defined between the piston connecting rod axis 100, the crankshaft axis 40, and the counterweight connecting rod axis 170, with the crankshaft axis 40 defining a vertex of the angle α. The angle α is less than 180 degrees and is preferably not 90 degrees. The inventors of the present invention discovered that vibrations in the engine 10 are reduced when the angle α is less than 180 degrees and more than 0 degrees. Conventional counterweight angles of conventional mass balancing systems, on the other hand, are exactly 180 degrees. According to a preferred embodiment, the angle α is also different from 90 degrees. Accordingly, the counterweight 120 does not operate perfectly out of phase with the pistons 50. The angle α is preferably between 150 and 179 degrees, and is more preferably between 165 and 175 degrees. Tests have shown that angles within these ranges are particularly well suited for reducing the inertial forces that are generated by the engine 10. Because the length L of the counterweight 120/lever arm 140 is limited, pivotal movement of the counterweight 120 generates additional forces at the lever arm axis 150 that are at least partially counterbalanced by making the angle α less than 180 degrees.

As shown in FIG. 1, the crankshaft 20 includes offset crank webs 200 that tend to counterbalance the pistons 50. A center of gravity 210 of the crankshaft 20 (including the offset crank webs 200) is offset from the crankshaft axis 40 by a distance W in the direction of the offset crank webs 200. As viewed in FIG. 1, a crankshaft center of gravity angle θ (crankshaft COG angle θ) is defined between the piston connecting rod axis 100, the crankshaft axis 40, and the crankshaft center of gravity 210, with the crankshaft axis forming the vertex of the angle θ. The angle θ is preferably more than 0 degrees and less than 180 degrees. The angle θ is preferably not 90 degrees. The angle θ is preferably between 120 and 179 degrees, and is more preferably between 140 and 160 degrees. The crankshaft COG 210 moves partially out of phase with the pistons 50 and partially counterbalances the movement of the counterweight 120 in the pivot defined at the lever arm axis 150, which partially compensates for the limited length L of the lever arm 140.

A reference plane 220 is defined by the crankshaft axis 40 and the piston connecting rod axis 100. When the pistons 50 are in their top dead center position (as shown in FIG. 1), the cylinder axis 70 is disposed within the reference plane 220. The crankshaft center of gravity 210 and the counterweight connecting rod axis 170 are disposed on opposite sides of the reference plane 220. Tests have shown that such positioning causes the crankshaft 20 and counterweight 120 to counterbalance each other in a direction perpendicular to the cylinder axis 70 (i.e., along the y plane illustrated in FIG. 1).

As shown in FIG. 1, when the pistons 50 are in their top dead center position, the lever arm axis 150 and the crankshaft center of gravity 210 are disposed on the same side of the reference plane 220. Conversely, the counterweight axis 160 and the counterweight connecting rod axis 170 are disposed on the opposite side of the reference plane 220 when the pistons 50 are in their top dead center position. According to another embodiment, the counterweight axis 160 is on the opposite side of the reference plane 220 as the counterweight connecting rod axis 170.

The inventors of the present invention discovered that making the angles θ and α less than 180 degrees improved the counterbalancing effect of the counterweight 120 and reduced vibrations in the engine 10. In an ideal case, inertial forces of the first and second order of magnitude, as measured in the direction of the cylinder axis 70, and inertial forces of the first order of magnitude that are perpendicular to the direction of the cylinder axis 70, can be balanced out almost completely. The lengths L, C, W, R, $Z_c$, $Y_c$, $Z_s$, $Y_s$, the angles θ, α, and the masses, shapes, and centers of gravity of the crankshaft 20, crankshaft connecting rod 130, and counterweight 120 may all be optimized through experimentation and/or mathematical calculation to best minimize vibrations in the engine 10.

Various connections between engine 10 components are generally described as pivotal connections. These pivotal connections can comprise any type of conventional pivotal connection (e.g., journal bearings, pivot pins, etc.). These pivotal connections are lubricated in one or more conventional manners (e.g., through bores in shafts/rods, etc.). Bearings are preferably provided at each pivotal connection. Crankshaft bearings 230 are disposed between the crankshaft 20 and the crankcase 30 on adjacent sides of connections between the crankshaft 20 and each of the connecting rods 80, 130. This placement of bearings 230 stiffens and supports the crankshaft 20, thereby reducing vibrations in the crankshaft 20.

Figure 3:
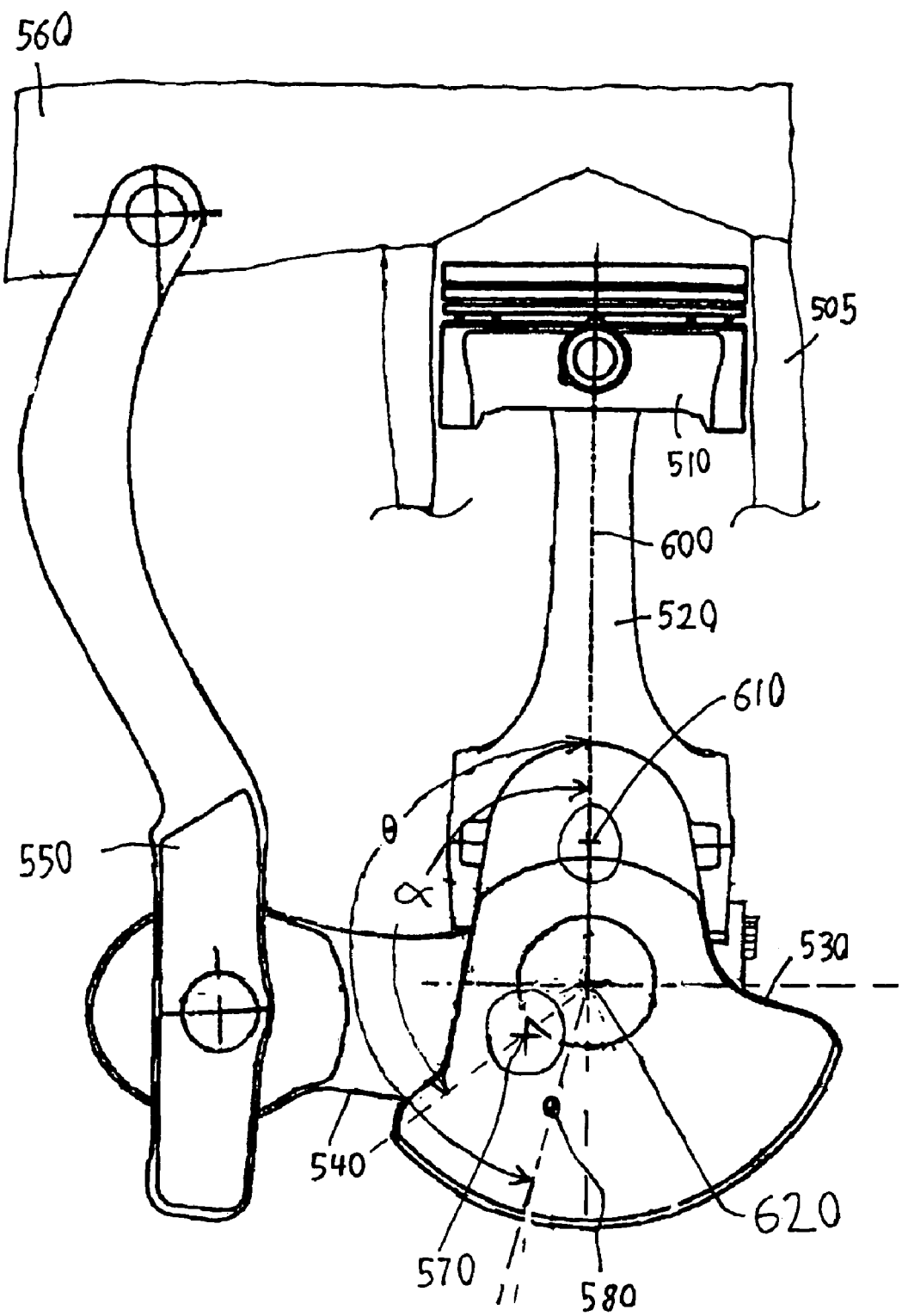
FIG. 3 is a partial front view of an engine according to another embodiment of the present invention.

FIG. 3 illustrates an engine 500 according to another embodiment of the present invention. As in the previous embodiment, the engine 500 includes cylinders 505, pistons 510, piston connecting rods 520, a crankshaft 530, a counterweight connecting rod 540, a counterweight 550, and a crankcase 560, among other elements. The engine 500 differs from the engine 10 in that the counterweight connecting rod 540 and counterweight 550 are rotated by approximately 90 degrees relative to the counterweight 120 and counterweight connecting rod 130 of the engine 10. However, this shift may be greater than or less than 90 degrees without deviating from the scope of the present invention. Positions of a counterweight connecting rod axis 570 and a crankshaft COG 580 are also preferably different than in the engine 10. Movement of the counterweight 550 relative to the in-line, in-phase pistons 510 simulates a 90 degree V-type engine. By orienting the counterweight 550 in a direction that is approximately parallel to the cylinder 505, the overall size of the engine 500 can be reduced.

As shown in FIG. 3, a counterweight angle α, which is defined in the same manner as in the engine 10, is less than 180 degrees and greater than 0 degrees. While the illustrated angle α is obtuse, the angle α may alternatively be less than or equal to 90 degrees. A crankshaft COG angle θ, which is defined in the same manner as in the engine 10, is also greater than 0 degrees and less than 180 degrees. While the illustrated angle θ is obtuse, the angle θ may alternatively be acute or 90 degrees.

In the illustrated embodiment, the crankshaft COG 580 and the counterweight connecting rod axis 570 operate out of phase with each other by a phase angle that equals the difference between angle α and angle θ. While the phase angle illustrated in FIG. 3 is acute for the engine 500, the phase angle may alternatively be 90 degrees, 180 degrees, or any other suitable angle.

As shown in FIG. 3, a reference plane 600 is defined by a piston connecting rod axis 610 and a crankshaft axis 620. The crankshaft COG 580 and the counterweight connecting rod axis 570 are disposed on opposite sides of the reference plane 600.

While the illustrated counterweights 120, 550 pivotally mount to crankcases 30, 560, a counterweight according to an alternative embodiment of the present invention may movably connect to a crankcase in any other suitable manner. For example, a counterweight may slide in a cylinder like a piston or slide along a linear or curved track in the crankcase.

The engines 10, 500 are particularly well suited for use in high performance and/or high speed applications where mass balancing is important. It is contemplated that the vehicle 1 can be any number of high performance and/or recreational vehicles including, but not limited to, motorcycles, all-terrain vehicles (ATVs), personal watercraft, motor sleds, snowmobiles, small aircraft, and other vehicles that are preferably used for recreational purposes. Engines according to the present invention are particularly well suited for use in vehicle in which the engine is coupled substantially directly to a frame of the vehicle, such that vibration dampening is even more important. Engines according to the present invention are also well suited for use in vehicles with limited engine space because the mass balancing systems in the engines 10, 500 are compact. The engines 10, 500 may alternatively be used in any suitable non-vehicular application where it is advantageous to reduce engine vibration.

While the illustrated engines 10, 500 include only one counterweight 120, 550, multiple counterweights may also be used without deviating from the scope of the present invention.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. An internal combustion engine comprising:
   a crankcase;
   a crankshaft disposed within crankcase for rotation about a crankshaft axis, the crankshaft having a first connecting-rod journal with a first connecting-rod journal axis and a second connecting-rod journal with a second connecting-rod journal axis;
   a piston;
   a piston connecting rod connecting the piston to the crankshaft about the first connecting-rod journal for relative rotation about the first connecting-rod journal axis;
   a counterweight connecting rod pivotally connected to the crankshaft about the second connecting-rod journal for relative rotation about the second connecting-rod journal axis; and
   a counterweight connected to the counterweight connecting rod;
   wherein a counterweight angle is formed between the first connecting-rod journal axis, the crankshaft axis, and the second connecting-rod journal axis with the crankshaft axis defining a vertex of the counterweight angle, and wherein the counterweight angle is more than 0 degrees and less than 180 degrees.

2. The internal combustion engine of claim 1, wherein the counterweight angle is at least 90 degrees.

3. The internal combustion engine of claim 2, wherein the counterweight angle is between 150 and 179 degrees.

4. The internal combustion engine of claim 3, wherein the counterweight angle is between 165 and 175 degrees.

5. The internal combustion engine of claim 1, wherein the crankshaft has a center of gravity that is offset from the crankshaft axis.

6. The internal combustion engine of claim 5, wherein the crankshaft axis and the first connecting-rod journal axis define a reference plane, and wherein the crankshaft center of gravity and the second connecting-rod journal axis are disposed on opposite sides of the reference plane.

7. The internal combustion engine of claim 6, wherein the counterweight pivotally connects to the crankcase at an axis that is disposed on the same side of the reference plane as the crankshaft center of gravity when the piston is in a top dead center position.

8. The internal combustion engine of claim 5, wherein a crankshaft center of gravity angle is formed between the first connecting-rod journal axis, the crankshaft axis, and the crankshaft center of gravity, with the crankshaft axis defining a vertex of the crankshaft center of gravity angle, and wherein the crankshaft center of gravity angle is more than 0 degrees and less than 180 degrees.

9. The internal combustion engine of claim 8, wherein the crankshaft center of gravity angle is at least 90 degrees.

10. The internal combustion engine of claim 8, wherein the crankshaft center of gravity angle is between 1 and 179 degrees.

11. The internal combustion engine of claim 1, wherein the counterweight pivotally connects to the counterweight connecting rod.

12. The internal combustion engine of claim 11, wherein the counterweight pivotally connects to the crankcase.

13. The internal combustion engine of claim 1, wherein the internal combustion engine is a two cylinder, in-line, for-cycle internal combustion engine.

\* \* \* \* \*